A. SINGELYN.
ASH SIFTER.
APPLICATION FILED JUNE 14, 1917.
1,260,823.
Patented Mar. 26, 1918.
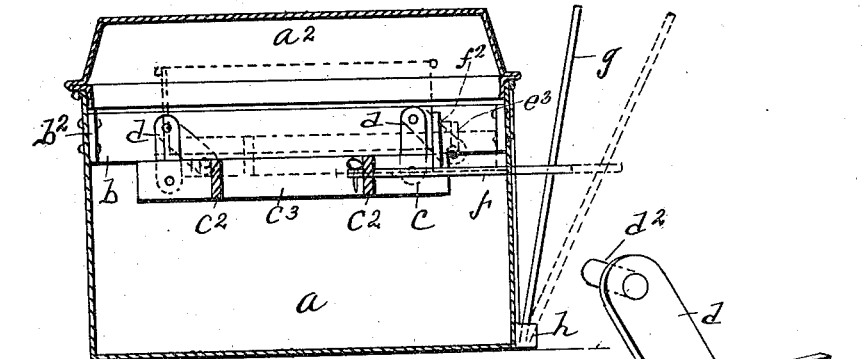
Fig. 1.
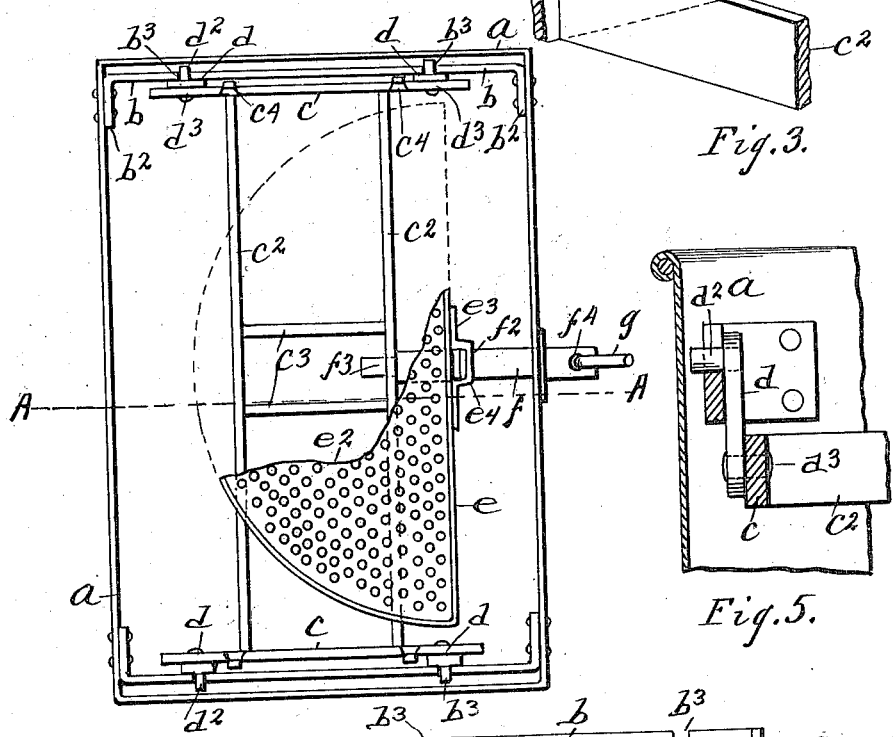
Fig. 2.
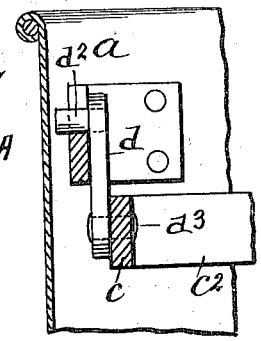
Fig. 3.
Fig. 5.
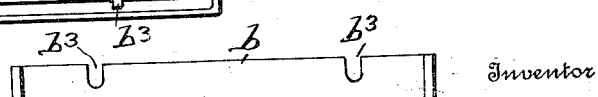
Fig. 4.
Inventor
ADOLPH SINGELYN.
By Rahzemond A. Parker
Attorney

UNITED STATES PATENT OFFICE.

ADOLPH SINGELYN, OF DETROIT, MICHIGAN.

ASH-SIFTER.

1,260,823.   Specification of Letters Patent.   Patented Mar. 26, 1918.

Application filed June 14, 1917. Serial No. 174,803.

*To all whom it may concern:*

Be it known that I, ADOLPH SINGELYN, a citizen of the United States, residing at Detroit, county of Wayne, State of Michigan, have invented a certain new and useful Improvement in Ash-Sifters, and declare the following to be a full, clear, and exact description of the same, such as will enable others skilled in the art to which it pertains to make and use the same, reference being had to the accompanying drawings, which form a part of this specification.

My invention relates to ash sifters and an object of my improvements is to provide a horizontal ash sifter in which the coarser material shall not accumulate and stop up the apertures.

I attain this object in the device illustrated in the accompanying drawing in which, Figure 1 is a cross section on the line A—A Fig. 2.

Fig. 2 is a plan view of an ash sifter embodying my invention, the pan being partly broken away and the cover of the casing removed.

Fig. 3 is a detail perspective view showing a portion of the frame and suspending link.

Fig. 4 is a detail elevation showing one of the supporting bars.

Fig. 5 is a detail sectional view showing the mode of suspending the pan-carrying frame.

$a$ is the inclosing casing and $a^2$ is a removable cover therefor. $b$ is a supporting bar having its ends turned at right angles at $b^2$ and bolted to the sides of the casing parallel and adjacent to one of its ends. The bar $b$ is supplied with notches $b^3$ which open at their upper ends at the edge of the bar $c$ and are curved at the lower ends to receive cylindrical pivot pins. $c\ c$ are horizontal end bars and $c^2\ c^2$ cross bars of a frame for carrying the ash pan. $c^3$ are bracing bars extending between the bars $c^2$ near their centers. The end bars $c\ c$ are so located that when the frame is swung to its limit their ends strike against the inturned ends $b^2$ of the bars $b\ b$.

$d\ d\ d\ d$ are links, having pins $d^2$ at their upper ends which pass into the slots $b^3$ and bear pivotally against the lower walls of said slots. $d^3$ are pivot pins securing the other ends of the bar $b$ to the end pieces $c\ c$. $c^4$ are lugs struck out of the upper end of the bars $c$ adapted to support the links $d$ in positions convenient to be engaged in the notches $b^3$ when the frame $c\ c^2\ c^3$ is placed in position.

$e$ is the ash pan having the usual apertured bottom plate $e^2$. The pan $e$ in the drawing is shown of the semi-cylindrical shape but of course can be of any convenient shape. $e^3$ is a lug having a vertical aperture $e^4$ therein and secured at the center of the front wall of the pan $e$.

$f$ is a reciprocating bar extending through a slot in the front wall of the casing $a$ and engaging by a pin $f^3$ or otherwise the frame $c\ c^2\ c^3$. The bar $f$ engages through the wall of the casing $a$ so as to be capable of turning in said aperture as a pivot so as to raise its inner end. $f^2$ is an engaging pin extending vertically upward from the rods $f$ engaging in the aperture $e^4$ in the lug or bail $e^3$. The engagement of the pin $f^2$ in the aperture $e^4$ and the engagement of the rod $f$ with the frame is such as to permit of the above angular motion of the rod without binding.

$g$ is a lever arm having a handle at its upper end and pivotally engaging in a slot or socket $h$ at the lower end of the casing $a$. The rod $g$ passes through the aperture $f^4$ in the outer end of the rod $f$. By taking hold of the handle at the upper end of the lever arm $g$ and oscillating said arm the rod $f$ is reciprocated which causes the frame $c\ c^2\ c^3$ to move in an arc of a circle determined by the hanging links $d$ supporting said frame. When the frame $c^2$ is moved to either extreme of its path it is rising upward because of the circular movement of the lower ends of the links $d$ and while thus rising it strikes against a bent portion $b^2$ of the horizontal rods $b$ which suddenly arrests its motion. This throws the ashes upward in the pan $e$ and clears the apertures in the bottom of the pan so that the ashes will pass through them readily.

The lever arm $g$ acts slantingly on the outer end of the rod $f$ so as to tend to throw the frame $c\ c^2\ c^3$ upward, thus assisting the clearing action.

The pan may be lifted or replaced readily upon the supporting frame $c\ c^2\ c^3$ and said frame itself may be raised out of the casing $a$ by simply lifting it with its supporting links vertically upward, the pins $d^2$ passing out of the open upper ends of the slots $d^3$.

It will be observed that the links $d$ are quite short so that at the end of the travel of the frame $c\ c^2\ c^3$ the pan is rising rapidly.

What I claim is:

1. In an ash sifter, a supporting bar $b$ having its ends turned inward at $b^2$, a pan pivoted to said bar so as to move in the arc of a circle, said pan being adapted to strike against the bent-in portions of the rod $b$ at the ends of its travel, substantially as and for the purpose described.

2. In an ash sifter, the combination of a casing, horizontal rods extending across the ends of said casing and having slots cut into the same from the upper edge, a frame adapted to support a pan, upwardly extending links on said frame, outwardly extending pins at the upper ends of said links adapted to engage in said slots, lugs on said frame adapted to support said links in approximately vertical positions.

3. In an ash sifter, the combination of a casing, horizontal rods extending across the ends of said casing and having slots cut into the same from the upper edge, a frame adapted to support the pan, upwardly extending links on said frame, outwardly extending pins at the upper ends of said links adapted to engage in said slots, lugs bent outward from the middle of the frame for sustaining said links in approximately vertical positions.

In testimony whereof, I sign this specification.

ADOLPH SINGELYN.

Copies of this patent may be obtained for five cents each, by addressing the "Commissioner of Patents, Washington, D. C."